United States Patent [19]
Ono

[11] Patent Number: 5,323,276
[45] Date of Patent: Jun. 21, 1994

[54] ERROR REMOVAL METHOD FOR A MULTI-TRACK TAPE RECORDER SYSTEM

[75] Inventor: Hitoshi Ono, Nagano, Japan

[73] Assignee: Sankyo Seiki Mfg. Co., Ltd., Nagano, Japan

[21] Appl. No.: 938,482

[22] Filed: Aug. 31, 1992

Related U.S. Application Data

[63] Continuation of Ser. No. 534,962, Jun. 7, 1990, abandoned.

[51] Int. Cl.⁵ .................. G11B 5/09; G11B 5/584; G11B 15/48
[52] U.S. Cl. .................. 360/53; 360/77.13; 360/74.1
[58] Field of Search .............. 360/31, 53, 77.13, 74.1, 360/74.4, 75, 77.01, 77.12, 77.14

[56] References Cited

U.S. PATENT DOCUMENTS

| | | | |
|---|---|---|---|
| 4,485,418 | 11/1984 | Bremmer | 360/77 |
| 4,516,165 | 5/1985 | Cunningham et al. | 360/53 |
| 4,786,984 | 11/1988 | Seeman | 360/31 |
| 4,796,125 | 1/1989 | Karsh | 360/77.12 |
| 4,904,938 | 2/1990 | O'Reilly et al. | 360/31 |
| 5,008,765 | 4/1991 | Youngquist | 360/77.12 |

*Primary Examiner*—Donald Hajec
*Assistant Examiner*—Won Tae C. Kim
*Attorney, Agent, or Firm*—McAulay Fisher Nissen Goldberg & Kiel

[57] ABSTRACT

An error removal system to be applied to a tape recorder of the type that stores and retrieves data in and from a plurality of tracks of a magnetic tape by means of a magnetic head includes the steps shifting the position of the magnetic head and detecting the center line of the target track from the data being retrieved by the magnetic head so that the magnetic head can be correctly placed on the center line of the target track and the data retrieval operation can be correctly resumed. With such an arrangement, the magnetic head of the data backup tape recorder can effectively and surely regain the target track even if an error is found in the retrieved signal due to an off-track condition. Other errors may be removed by employing a series of microstep adjustments to the magnetic head.

4 Claims, 6 Drawing Sheets

| MICRO-STEP CODE \ TAPE TYPE | 9-TRACK TAPE | 15-, 18-, 26- TRACK TAPE |
|---|---|---|
| MICROSTEP 0 | ON-TRACK SEEK | ON-TRACK SEEK |
| " 1 | " | " |
| " 2 | MOVE 25μm UPWARD | MOVE 12.5μm UPWARD |
| " 3 | MOVE 25μm DOWNWARD | MOVE 12.5μm DOWNWARD |
| " 4 | MOVE 50μm UPWARD | MOVE 25μm UPWARD |
| " 5 | MOVE 50μm DOWNWARD | MOVE 25μm DOWNWARD |
| " 6 | MOVE 75μm UPWARD | MOVE 37.5μm UPWARD |
| " 7 | MOVE 75μm DOWNWARD | MOVE 37.5μm DOWNWARD |
| " 8 | MOVE 100μm UPWARD | MOVE 50μm UPWARD |
| " 9 | MOVE 100μm DOWNWARD | MOVE 50μm DOWNWARD |
| " 10 | MOVE 125μm UPWARD | MOVE 62.5μm UPWARD |
| " 11 | MOVE 125μm DOWNWARD | MOVE 62.5μm DOWNWARD |
| " 12 | MOVE 150μm UPWARD | MOVE 75μm UPWARD |
| " 13 | MOVE 150μm DOWNWARD | MOVE 75μm DOWNWARD |
| " 14 | MOVE 150μm UPWARD | MOVE 85.5μm UPWARD |
| " 15 | MOVE 150μm DOWNWARD | MOVE 85.5μm DOWNWARD |

ERROR REMOVAL METHOD FOR A MULTI-TRACK TAPE RECORDER SYSTEM

This application is a continuation of application Ser. No. 07/534,962, filed Jun. 7, 1990 now abandoned.

BACKGROUND OF THE INVENTION

1. Field of the Invention

This invention relates to an error removal system to be used for a data backup tape recorder.

2. Prior Art Background

A conventional tape recorder for data backup applications normally stores and retrieves data in and from as many as 9, 15 or 18 tracks on a single magnetic tape by means of a magnetic head, which comprises as integral parts thereof a writing section realized by winding a wire around a core having a writing gap and a reading section realized by winding a wire around a core having a reading gap which is wider than the writing gap. The writing section and the reading section are arranged in a direction parallel to the running direction of the magnetic tape and are operational for a single channel. For writing data on a magnetic tape by such a data backup tape recorder, the writing section of the magnetic head writes a reference signal on the central track that provides a reference and then data on this and other tracks by following a certain procedure.

For retrieving the data from the magnetic tape, on the other hand, the reading section of the magnetic head reads the reference signal and then seeks a target track on the magnetic tape specified by the reference signal so that the magnetic head starts reading the data from that track. When an error is found in the data being retrieved, the tape recorder immediately stops the magnetic tape, winds it back and moves the magnetic head upward or downward by a certain distance before it restarts the data retrieving operation by means of the related reading section of the magnetic head.

Figure 7:
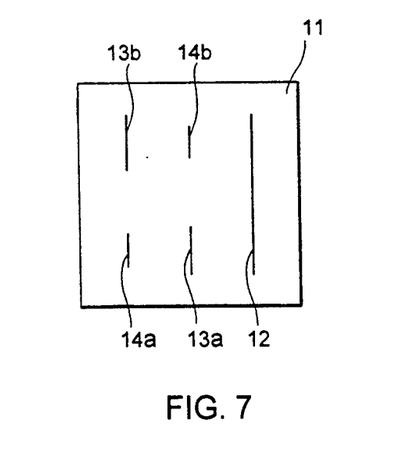
FIG. 7 is a schematic front view of a magnetic head of the data backup tape recorder of FIG. 2 as known from the prior art.

Recently, there have been proposed data backup tape recorders that can store data and retrieve data in and from as much as 26 tracks on a single magnetic tape. As schematically illustrated in FIG. 7, magnetic head 11 of such a tape recorder comprises, as integral parts thereof, a pair of erasing sections each having a core around which a wire is wound, a pair of writing sections each having a core around which a wire is wound, the cores of the writing sections being respectively provided with writing gaps 13a, 13b, and a pair of reading sections each having a core around which a wire is wound. The cores of the reading sections are respectively provided with reading gaps 14a, 14b. The writing section having the writing gap 13a and the reading section having the reading gap 14a are arranged along the running direction of the magnetic tape in this order and constitute respectively a writing section and a reading section for a lower channel, while the writing section having writing gap 13b and a reading section having reading gap 14b are arranged along the direction opposite to the running direction of the magnetic tape in this order and constitute respectively a writing section and a reading section of an upper channel. The writing sections and the reading sections for these two channels are arranged at a predetermined pitch in a direction perpendicular to the running direction of the magnetic tape. The width of the cores of the writing sections is 178 μm and that of the cores of the reading sections is 127 μm, which is considerably smaller than the width of any conventional cores which is normally 267 μm.

Figure 6:
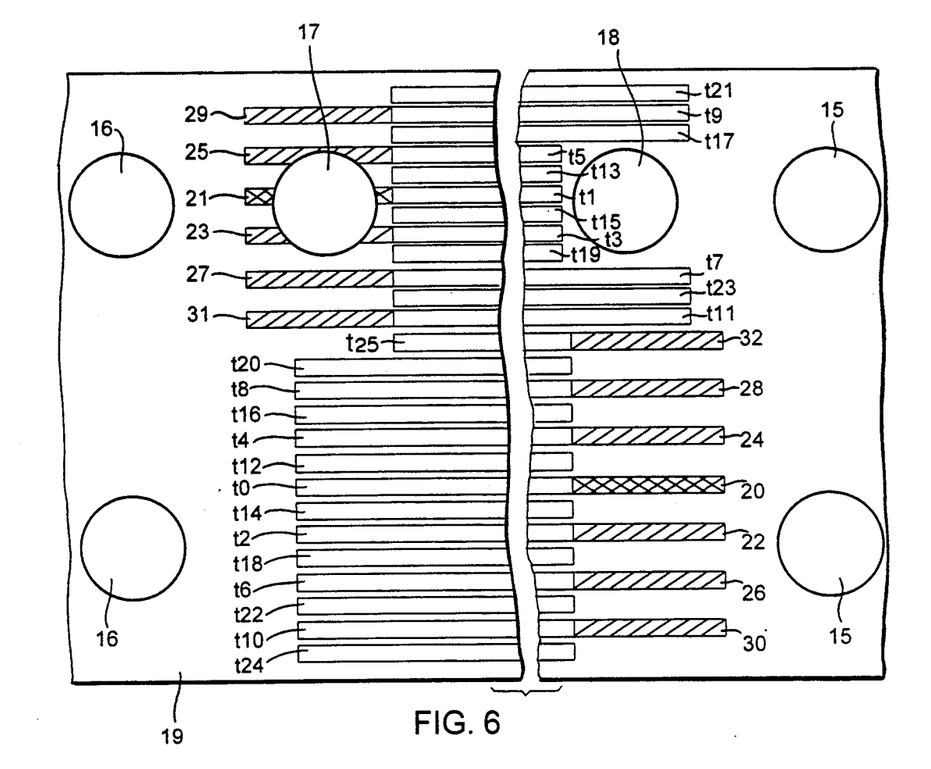
FIG. 6 is a schematic plan view of a part of a magnetic tape that can be used with the data backup tape recorder of FIG. 2 as known from the prior art.

For a data backup tape recorder of this known type, a magnetic tape 19 provided with a number of marks comprising a BOT (Begin Of Tape) mark 15, an EOT (End of Tape) mark 16, an EW (Early Warning) mark 17 and a LP (Load Point) mark 18 as illustrated in FIG. 6 is used. Each of the marks 15 through 18 is, in fact, one (or more than one) hole(s) formed through the tape 19 and arranged along the center line of the upper half portion and/or that of the lower half portion of the tape as seen in its running direction. The BOT mark 15 and the EOT mark 16 are respectively located at the front and rear ends of magnetic tape 19, whereas the EW mark 17 and the LP mark 18 are located on the center line of the upper half portion of magnetic tape 19 and separated respectively from the BOT mark 15 and the EOT mark 16 by a given distance toward the middle of the tape. For storing data in a magnetic tape 19 by a data backup tape recorder of this type, magnetic tape 19 is moved rightward and the writing section of magnetic head 11 as seen in Figure having writing gap 13a for writing data in the lower channel is activated so that a reference signal having a specific frequency $f_o$ is written in reference signal recording area 20 immediately after BOT 15 located on the center line of the lower half portion of the magnetic tape 19 and then data are written in data recording area t0 located after said reference signal recording area 20.

Thereafter, magnetic tape 19 is moved leftward and the writing section of magnetic head 11 having writing gap 13b for writing data in the upper channel is activated so that a reference signal with frequency $f_o$ is written in reference signal recording area 21 immediately after EOT 16 located on the center line of the upper half portion of the magnetic tape 19. Then data are written in data recording area t1 located after said reference signal recording area 21. Then, again, magnetic tape 19 is moved rightward and the writing section of magnetic head 11 having writing gap 13a for writing data in the lower channel is activated so that a reference signal having a specific frequency $f_1$ is written in reference signal recording area 22 immediately after BOT 15 located on the center line of the lower half portion of the magnetic tape 19. Then data are written in data recording area t2 located after the reference signal recording area 22. Thereafter, magnetic tape 19 is moved leftward and the writing section of magnetic head 11 having writing gap 13b for writing data in the upper channel is activated so that a reference signal with frequency $f_1$ is written in reference signal recording area 23 immediately after EOT 16 located on the center line of the lower half portion of magnetic tape 19. Then data are written in data recording area t3 located after the reference signal recording area 23. In a similar manner, magnetic tape 19 is moved alternately rightward and leftward so that reference signals with frequency $f_1$ and data are recorded by means of the magnetic head 11 respectively in reference signal recording areas 24, 25, . . . 31 and data recording areas t4, t5, . . . t11 in the upper and lower half portions of magnetic tape 19. Then magnetic tape 19 is again moved alternately rightward and leftward so that data are written by means of magnetic head 11 in data recording areas t12, t13, . . . t24 in the upper and lower half portions of magnetic tape 19. Finally, magnetic tape 19 is moved rightward so that reference signals with frequency $f_1$ and data are respectively recorded in reference signal recording area 32 and data recording area t25.

For retrieving the data stored in magnetic tape 19, magnetic head 11 of the data backup tape recorder is moved in a direction perpendicular to the running direction of the tape to seek the track of the tape that stores the data to be retrieved and the data stored in the data recording area of that track is then read out by means of the reading section having reading gap 14a or 14b, whichever appropriate, of magnetic head 11. More specifically, if the track that stores the data to be retrieved is in the lower half portion of magnetic tape 19, the tape will be moved rightward and the reading section having reading gap 14a will be used for data retrieval, whereas the tape will be moved leftward and the reading section having reading gap 14b will be activated for retrieving data stored in any of the tracks in the upper half portion of magnetic tape 19.

PROBLEMS TO BE SOLVED BY THE INVENTION

Using a data backup tape recorder of the type described above, data are retrieved from a specified target track of the magnetic tape when that track is found immediately above the magnetic head of the tape recorder as the tape is moved rightward or leftward and, if an error is found in a signal read out during a data retrieving operation, the tape recorder immediately stops the magnetic tape, winds it back and moves the magnetic head upward or downward by certain distance before it starts the data retrieving operation by means of the related reading section of the magnetic head. However, since the magnetic head comprises up to two-channel writing and reading sections and data are stored in and retrieved from as many as 26 tracks and since the reading sections are significantly narrower than the writing sections, the magnetic head can hardly hit the center line of the target track by shifting it upward or downward by a certain distance if an error is found in a signal read out during a data retrieving operation due to an off-track condition where the magnetic head is away from the target track. This means that a set of motions for error recovery consisting of a shift of the magnetic head, a rewinding motion of the magnetic tape and a restart of data retrieval will be repeated a number of times and, therefore, hard errors are likely to occur.

PRIMARY OBJECT OF THE INVENTION

It is therefore a primary object of the present invention to provide an improved error recovery system that can effectively and surely place the magnetic head of a data backup tape recorder on the target track if there is an error in a signal during a data retrieving operation due to an off-track condition and, hence, the above mentioned problems can be avoided.

SUMMARY OF THE INVENTION

According to the invention, the above object is achieved by providing for a tape recorder of the type that stores and retrieves reference signals on a plurality of tracks of a magnetic tape by means of a magnetic head an improved error recovery system and method which, upon occurrence of an error in a signal read out during a data retrieval operation, operates by shifting the position of the magnetic head and then detecting the center line of the target track from the data being retrieved by the magnetic head so that the magnetic head can be correctly placed on the center line of the target track and the data retrieval operation can be correctly resumed.

The present invention will now be described in greater detail by referring to the accompanying drawings that illustrate the best mode of carrying out the invention and the scope of the invention will be pointed out by the appended claims.

DESCRIPTION OF THE PREFERRED EMBODIMENTS

Figure 1:
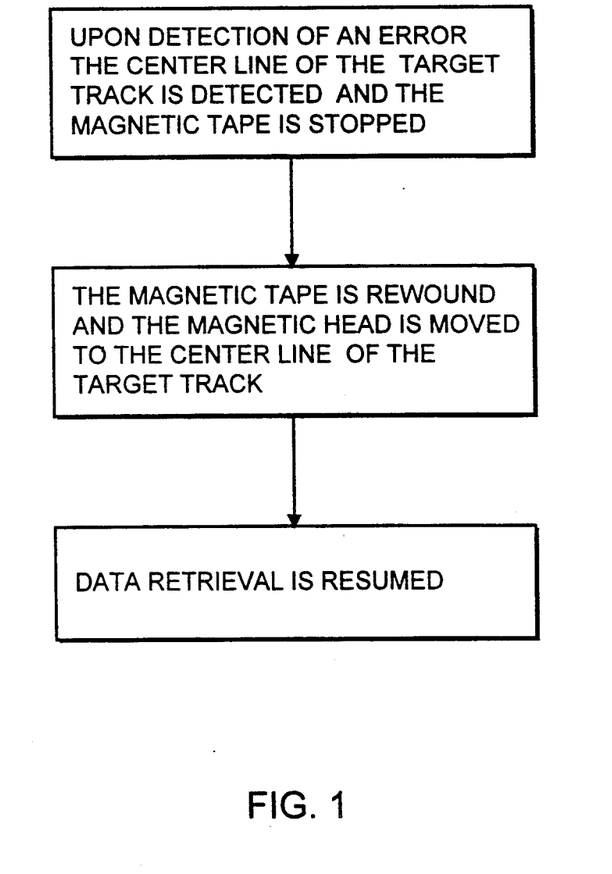
FIG. 1 is a basic flow chart showing how the method of the invention is carried out.
Figure 2:
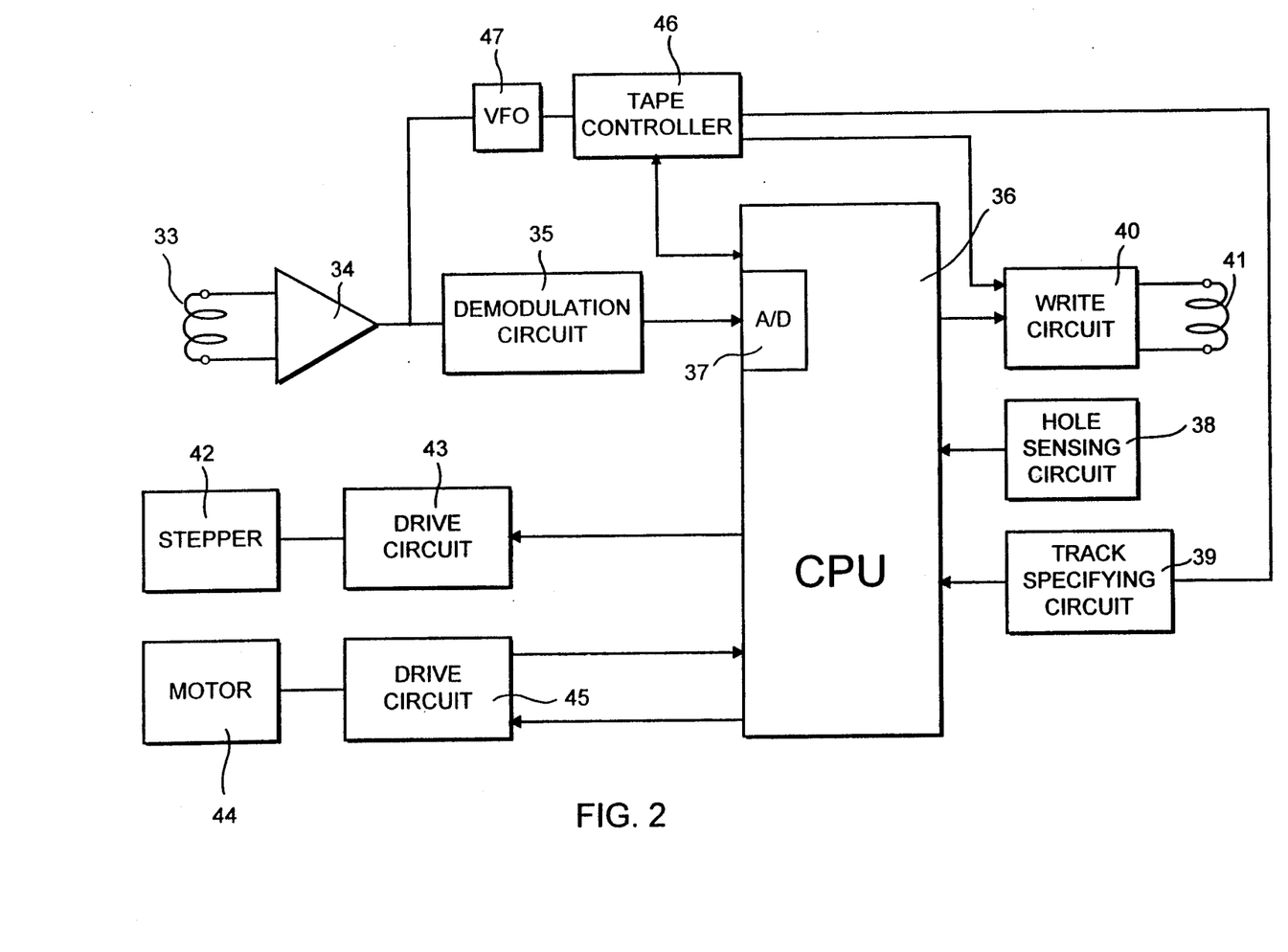
FIG. 2 is a block diagram showing the circuit configuration of a data backup tape recorder to which the method of the invention is applied.

FIG. 2 of the accompanying drawings illustrates, in block diagram form, the circuit configuration of a data backup tape recorder to which the method of the invention is applied.

With this data backup tape recorder, data are written and read in and from as many as twenty six tracks arranged on a magnetic tape 19 by means of a magnetic head 11. The principal features of magnetic tape 19 and magnetic head 11 have been described earlier. Signals retrieved from reading section 33 having a reading gap 14a or 14b (See FIG. 7) are amplified by amplifier 34 and then, the envelope of the modulated signal is obtained by demodulation circuit 35. This demodulated signal is then supplied to analog/digital converter 37 of microcomputer (CPU) 36. Hole sensor circuit 38 detects holes 15 through 18 through magnetic tape 19 and sends a detection signal to CPU 36, while track specifier circuit 39 sends a track signal representing the track specified by the operator to CPU 36. Write circuit 40 selectively drives an erasing section having an erasing gap 12 or a writing section 41 having reading gap 14a or 14b depending on the control signal transmitted from the CPU 36. Stepper 42 plays the role of moving the magnetic head 11 in a direction perpendicular to the running direction of the magnetic tape and driving circuit 43 drives the stepper 42 in accordance with the control signal transmitted from CPU 36. Motor 44 is driven by driving circuit 45 to make magnetic tape 19 run at a predetermined rate or, conversely, the driving circuit 45 drives the motor 44 according to the control signal transmitted from the CPU 36. The driving circuit 45 comprises a tacho-generator for detecting the rate of rotation of the motor 44 and the pulse representing the rate of rotation of the motor is transmitted to CPU 36.

While a data writing operation is being carried out, CPU 36 causes driving circuit 45 to drive the motor 44 so that the magnetic tape 19 runs rightward and activates the writing section having writing gap 13a of magnetic head 11 for the lower channel by way of a tape controller and write circuit 40 to write a reference signal having a specific frequency $f_o$ in reference signal recording area 20 located after BOT 15 on the center line of the lower half portion of magnetic tape 19 and, then, data in data recording area t0. CPU 36 then causes magnetic tape 19 to run leftward and activates the writing section having the writing gap 13b of the magnetic head 11 for the upper channel to write a reference signal having specific frequency $f_o$ in reference signal recording area 21 located after EOT 16 on the center line of the upper half portion of magnetic tape 19 and, then, data in data recording area t1. Thereafter, the CPU 36 causes magnetic tape 19 to run rightward and activates the writing section having writing gap 13a of magnetic head 11 for the lower channel to write a reference signal having a specific frequency $f_1$ in reference signal recording area 22 located after BOT 15 on the center line of the lower half portion of the magnetic tape 19 and then data in data recording area t2. Then again, CPU 36 causes magnetic tape 19 to run leftward and activates the writing section having writing gap 13b of magnetic head for the upper channel to write a reference signal having the specific frequency $f_1$ in reference signal recording area 23 located after EOT 16 on the center line of the upper half portion of magnetic tape 19 and then data in data recording area t3. In a similar manner, CPU 36 moves magnetic tape 19 alternatively rightward and leftward so that reference signals having a specific frequency $f_1$ and data are recorded by means of magnetic head 11 respectively in reference signal recording areas 24, 25, . . . 31 and data recording areas t4, t5, . . . t11 in the upper and lower half portions of the magnetic tape 19. Then, again, magnetic tape 19 is moved alternately rightward and leftward so that data are written by means of magnetic head 11 in data recording areas t12, t13, . . . t24 in the upper and lower half portions of magnetic tape 19. Finally, magnetic tape 19 is moved rightward so that reference signals having a specific frequency $f_1$ and data are respectively recorded in reference signal recording area 32 and data recording area t25.

For retrieving data, CPU 36 causes driving circuit 43 to drive stepper 42 in accordance with the track specifying signal transmitted from track specifying circuit 39 to move magnetic head 11 of the data backup tape recorder in a direction perpendicular to the running direction of magnetic tape 19 in order to seek the track of the tape that stores the data to be retrieved and the data stored in the data recording area is then read out by means of the reading section having reading gap 14a or 14b, whichever appropriate, of magnetic head 11 so that the retrieved signals are taken up by means of amplifier 34 and demodulation circuit 35 and undergo an A/D conversion by A/D converter 37 for further processing. More specifically, if the track that stores the data to be retrieved is in the lower half portion of magnetic tape 19, the tape will be moved rightward and the reading section having reading gap 14a will be used for data retrieval, whereas the tape will be moved leftward and the reading section having reading gap 14b will be activated for retrieving data stored in any of the tracks in the upper half portion of magnetic tape 19.

Figure 3:
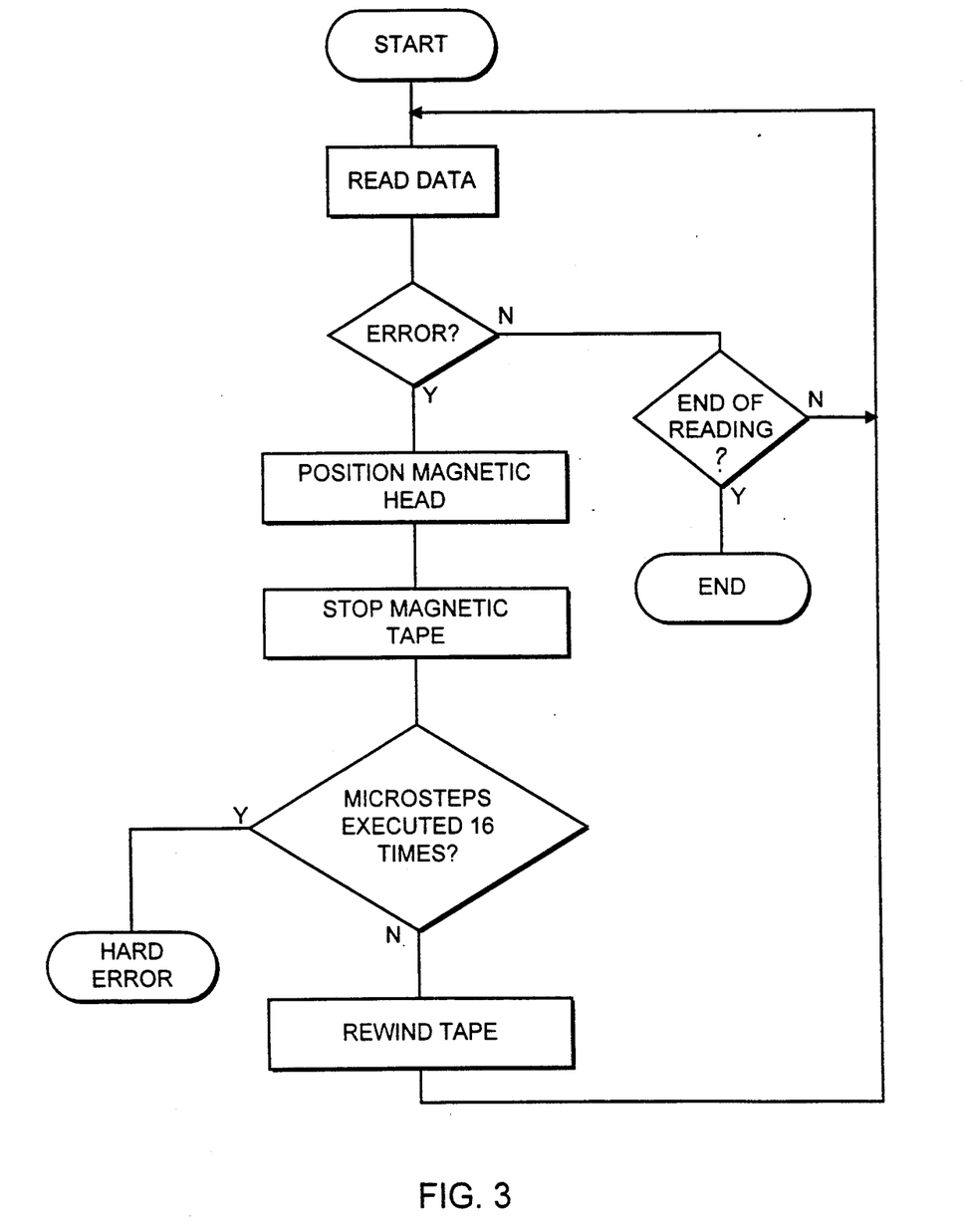
FIG. 3 is a flow chart showing how the process of the method of the present invention is conducted by the CPU of the data backup tape recorder of FIG. 2.

When a data retrieval operation is under way, tape controller 46 takes in the signal read out by the related reading section of magnetic head 11 by way of amplifier 34 and VFO (Variable Frequency Oscillator) 47 and checks for any errors that might be found in the signal as illustrated in FIG. 3. If an error is found in the retrieved signal, then the CPU 36 continues to cause drive circuit 45 to drive motor 44 and at the same time drive circuit 43 to drive stepper 42 for correct positioning of magnetic head 11. During this positioning operation of magnetic head 11, CPU 36 proceeds with sixteen microsteps 0 through 15, one by one, until the error is eliminated from the retrieved signal. More specifically, if an error is found in a retrieved signal, CPU 36 carries out microstep 0, to begin with, in order to perform an on-track seek operation for placing magnetic head 11 on the center line of the target track on magnetic tape 19. At this microstep 0, CPU 36 causes drive circuit 43 to drive stepper 42 to move magnetic head 11 across the target track TR and receives the signal read out by the related reading section of magnetic head 11. This is done by way of amplifier 34 and demodulation circuit 35 to determine the middle position between two points A and B where the retrieved signal reaches a predetermined level (½ of the maximum level) which middle portion is on the center line of the target track TR of the magnetic tape 19. Then, CPU 36 causes drive circuit 45 to stop motor 44, which in turn stops magnetic tape 19, and then causes drive circuit 45 to drive motor 44 again to move magnetic tape 19 in the opposite direction until the tape is wound back by a certain length. Thereafter, CPU 36 causes drive circuit 45 to drive motor 44 to move magnetic tape 19 in the original direction for reading data for the second time. Tape controller 46 receives the signal read out by the related reading section of magnetic head 11 by way of amplifier 34 and VFO 47 to check for any errors that might be found in the signal and, if an error is found in the signal, it proceeds to microstep 1 and carries out the next microstep.

Figure 4:
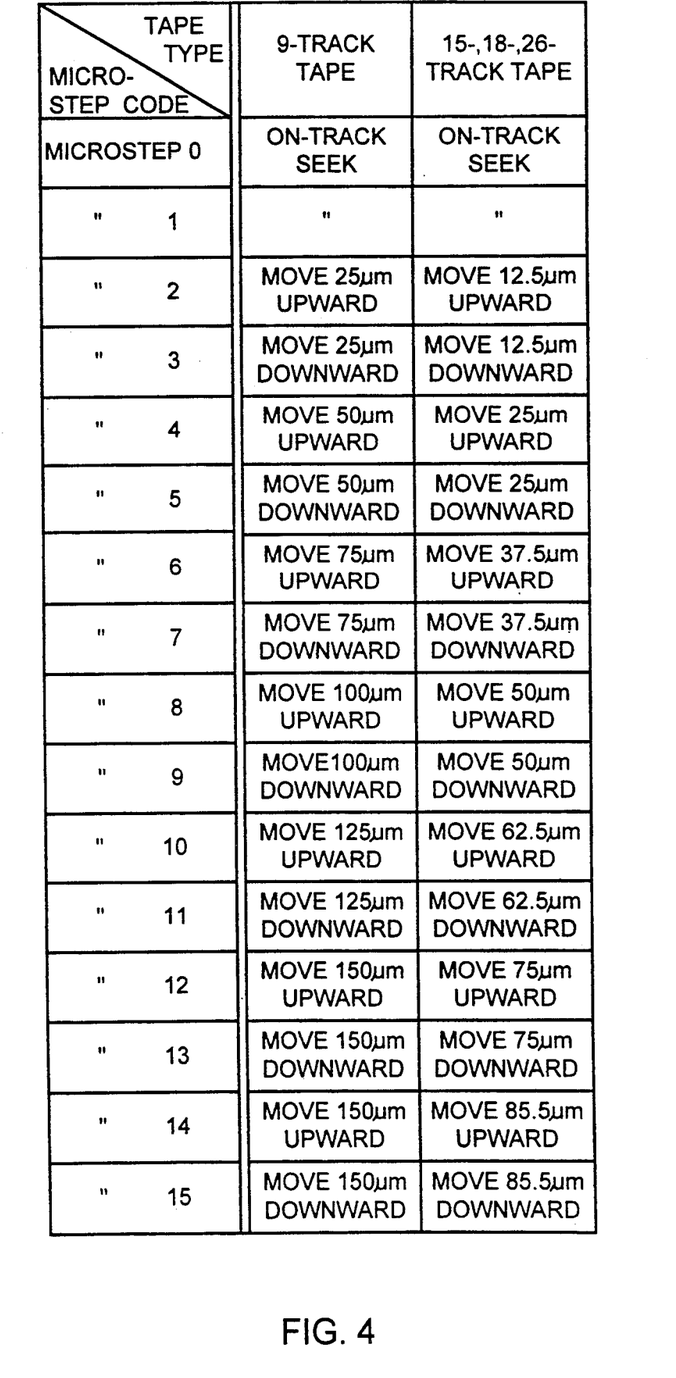
FIG. 4 is a chart showing the microsteps of operation of the data backup tape recorder of FIG. 2.
Figure 5A:
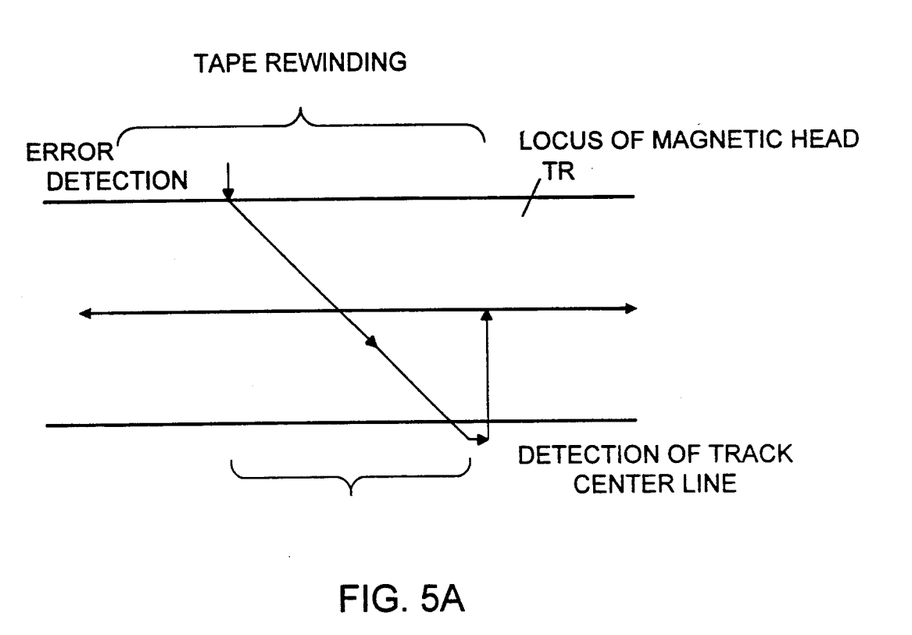
FIGS. 5(a) and (b) are illustrations of how the error recovery system of the invention functions for the data backup tape recorder of FIG. 2.
Figure 5B:
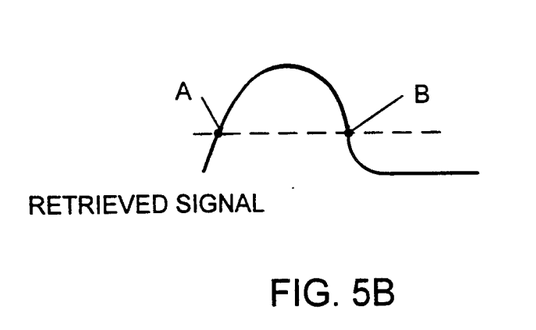

In the meantime, CPU 36 performs an operation similar to that for microstep 0 in order to move magnetic head 11 onto the center line of the target track TR of magnetic head 11 and then causes drive circuit 45 to stop motor 44, which, in turn, stops the magnetic tape 19. Then, CPU 36 causes drive circuit 45 to drive motor 44 to move magnetic tape 19 in the opposite direction until the tape is wound back by a certain length and, thereafter, it causes drive circuit 45 to drive motor 44 to move magnetic tape 19 in the original direction for reading data for another time. Tape controller 46 receives in the signal read out by the related reading section of magnetic head 11 by way of amplifier 34 and VFO 47 to check for any errors that might be found in the signal. If an error is found in the signal in this error checking operation, CPU 36 proceeds to microstep 2 and carries out the microstep. More specifically, CPU 36 causes drive circuit 43 to drive stepper circuit 42 to move magnetic head 11 upward by 25 $\mu$m, if magnetic tape 19 is a 9-track tape, and by 12.5 $\mu$m, if magnetic tape 19 is a 15-, 18- or 25-track tape. Then, CPU 36 causes drive circuit 45 to stop motor 44, which in turn stops magnetic tape 19, and then causes drive circuit 45 to drive motor 44 again to move magnetic tape 19 in the opposite direction until the tape is wound back by a certain length. Thereafter, CPU 36 causes drive circuit 45 to drive motor 44 to move magnetic tape 19 in the original direction for reading data for another time. Tape controller 46 receives the signal read out by the related reading section of magnetic head 11 by way of amplifier 34 and VFO 47 to check for any errors that might be found in the signal and then proceeds with microsteps 3 through 15, repeating the operation of stopping, rewinding and forwarding magnetic tape 19 and checking for errors until the error is eliminated from the retrieved signal. As illustrated in FIG. 4, if magnetic tape 19 is a 9-track tape, the magnetic head 11 is moved 25 µm downward, 50 µm upward, 50 µm downward, 75 µm upward, 75 µm downward, 100 µm upward, 100 µm downward, 125 µm upward, 125 µm downward, 150 µm upward, 150 µm downward, 175 µm upward and 175 µm downward respectively at microsteps 3 through 15 by causing the drive circuit 43 to drive stepper 42. On the other hand, if the magnetic tape 19 is a 15-, 18- or 26- track tape, the magnetic head 11 is moved 5 µm downward, 25 µm upward, 25 µm downward, 37.5 µm upward, 37.5 µm downward, 50 µm upward, 50 µm downward, 62.5 µm upward, 62.5 µm downward, 75 µm upward, 75 µm downward, 87.5 µm upward and 87.5 µm downward respectively at microsteps 3 through 15 by causing the drive circuit 43 to drive the stepper 42. On the other hand, tape controller 45 suspends the microsteps and the operation of stopping and rewinding the magnetic tape 19 for reading data and checking errors until the error is eliminated from the retrieved signal and, if the error is not eliminated after executing the microstep 15, it determines the error to be a hard error.

As described above for the best mode of carrying out the invention, if an error is found in the signal read out by magnetic head 11 of a data backup tape recorder to which the system of the invention is applied, magnetic tape 19 is allowed to keep running for a while and rewound for the first time when the magnetic head 11 is stopped upon detecting the center line of the target track. This is done by moving magnetic head 11 on the basis of the retrieved signal so that magnetic head 11 may be correctly moved onto the center line of the target track for reading the data on the track for the second time. With such an arrangement, the number of times with which the error recovery operation has to be repeated before the magnetic head regains its target track on the magnetic tape will be dramatically reduced and the target track will be correctly located with a high probability, to say nothing of possible reduction in the number of hard errors. Moreover, since the error recovery operation is carried out by sequentially executing sixteen microsteps 0 through 15, data errors due to any of the pin holes provided through the magnetic tape 19 may be effectively avoided.

While the magnetic tape 19 is allowed to keep running and the magnetic head is moved for detecting the center line of the target track of the magnetic tape when an error is found in the retrieved signal in the above description, alternatively, the magnetic tape 19 may be rewound and then moved forward again while the magnetic head 11 is moved for detection of the center line of the target track. With such an alternative arrangement, the magnetic head 11 can also be correctly moved onto the center line of the target track for reading data for the second time.

As is apparent from the above description, with a data backup tape recorder incorporating the error recovery system of the present invention, when an error is found in a signal read out during a data retrieval operation, the system shifts the position of the magnetic head and detects the center line of the target track from the data being retrieved by the magnetic head so that the magnetic head can be correctly placed on the center line of the target track and the data retrieval operation can be correctly resumed. With such an arrangement, the magnetic head of the data backup tape recorder can effectively and surely regain the target track even if an error is found in the retrieved signal due to an off-track condition.

While the foregoing description and drawings represent the preferred embodiments of the present invention, it will be obvious to those skilled in the art that various changes and modifications may be made therein without departing from the true spirit and scope of the present invention.

What is claimed is:

1. An error removal method to be applied to a tape recorder of the type that stores and retrieves data in and from a plurality of data tracks, by means of a magnetic head having reading and writing sections comprising the steps of:
   (a) reading data from a data track of a magnetic tape;
   (b) checking the data to determine whether an error exists or not;
   (c) when an error is determined, moving the magnetic head across said data track while reading the data;
   (d) determining a center of said data track based on an output level of the read data;
   (e) moving the magnetic head to the center of said data track;
   (f) reading the data again; and
   (g) when no error exists, stop, or repeat steps b-f;
   wherein the magnetic head is moved while the tape is moving; and
   wherein the tape is rewound prior to reading the data to determine whether the error is removed.

2. The method of claim 1 also including, if an error still exists in the data read in said step (f), the steps of:
   (h) moving the magnetic head a predetermined distance in the direction of the width of the tape:
   (i) reading the data and checking if the error still exists; and
   (j) if the error still exists, repeating said steps (h) and (i) a predetermined number of times according to a prescribed sequence.

3. The method of claim 2 wherein said predetermined distance that said head is moved is a function of the number of tracks on the magnetic tape.

4. The method of claim 1 wherein the data received from the magnetic head is a modulated signal and the method includes:
   extracting the envelope of the modulated signal,
   determining the maximum value of said signal; and
   determining the center of said signal from a predetermined fraction of the maximum value in order to detect the center of the track.

* * * * *